United States Patent Office 3,067,161
Patented Dec. 4, 1962

3,067,161
VISCOUS COMPOSITIONS OF AQUEOUS SALT SOLUTIONS AND MONOALKENYLAROMATIC SULFONATE POLYMERS
Harold H. Roth, Bay City, Mich., assignor to The Dow Chemical Company, Midland, Mich., a corporation of Delaware
No Drawing. Filed Oct. 28, 1959, Ser. No. 849,161
6 Claims. (Cl. 260—29.6)

This invention pertains to viscous compositions of aqueous salt solutions wherein the viscosity-increasing agents are certain water-soluble, linear, high molecular weight monoalkenylaromatic sulfonate polymers.

Conventional alkenylaromatic polymer sulfonates which increase the viscosity of water usually cause considerably less increase in the viscosity of solutions containing soluble salts such as sodium chloride.

For example, a sulfonate obtained by sulfonation of a molding grade polystyrene, and which in water solution at 0.5 percent by weight concentration may have a viscosity of 1000 centipoises, may at the same concentration in a one percent by weight sodium chloride brine solution have a viscosity of less than 5 centipoises. It is uneconomical in most instances to employ enough of such relatively ineffective resin sulfonates to obtain an appreciable increase in viscosity of aqueous salt solutions.

There are needs for viscous compositions of aqueous salt solutions for use in industry as hydraulic transmission media, for fluid displacement, and in oil well drilling, improvement, treating, and operation.

Accordingly, it is an object of this invention to provide viscous compositions of aqueous salt solutions, particularly ones in which the viscosity is increased by the presence of certain monoalkenylaromatic sulfonate polymers.

Other objects and advantages of the invention will become apparent in the following description.

The objects of this invention have been attained in viscous compositions of aqueous salt solutions wherein the viscosity increasing agents are water-soluble, linear, high molecular weight monoalkenylaromatic sulfonate polymers as fully set forth hereinafter.

The water-soluble, linear, high molecular weight polymer sulfonates with which this invention is concerned correspond to addition polymers of monoalkenylaromatic sulfonates having the formula

wherein Ar is a divalent aromatic radical selected from the group consisting of hydrocarbon radicals and nuclear chlorinated hydrocarbon radicals having its valence bonds on nuclear carbon atoms, R is a member of the group consisting of hydrogen and methyl, M is a cation, and the other symbols have their usual meanings. Specific examples of sulfonates which are used in accordance with this invention are water-soluble, linear, high molecular weight polymers of styrenesulfonic acids, α-methylstyrenesulfonic acids, ar-methylstyrenesulfonic acids, ar-dimethylstyrenesulfonic acids, α,ar-dimethylstyrenesulfonic acids, ar-ethylstyrenesulfonic acids, ar-isopropylstyrenesulfonic acids, vinylnaphthalenesulfonic acids, ar-chlorostyrenesulfonic acids, ar-dichlorostyrenesulfonic acids, ar-chloro-ar-methylstyrenesulfonic acids, and the water-soluble salts of such resin sulfonic acids.

The term "sulfonate" is used herein to mean the free sulfonic acid and its salts, M in the foregoing formula being a cation, including hydrogen and metal, ammonium, amine, and like salt-forming cations. Specific examples, for purpose of illustration and not of limitation, of suitable salts are the sodium, potassium, calcium, ammonium, and amine salts of the polymer sulfonates.

The addition polymers correspond to homopolymers of the monoalkenylaromatic sulfonates, copolymers of two or more of such sulfonates, and copolymers of one or more of such sulfonates and one or more of other monoethylenically unsaturated monomers wherein the monoalkenylaromatic sulfonate is at least 60 percent by weight of the total polymer. In the latter such polymers, units corresponding to a monoalkenylaromatic sulfonate are additionally combined with units corresponding to one or more kinds of monoethylenically unsaturated compounds examples of which, for purpose of illustration and not of limitation, are styrene, α-methylstyrene, ar-methylstyrenes, ar-dimethylstyrenes, α,ar-dimethylstyrenes, ar-ethylstyrenes, ar-isopropylstyrenes, vinylnaphthalenes, ar-chlorostyrenes, ar-dichlorostyrenes, ar-chloro-ar-methylstyrenes, isobutylene, ethylenically unsaturated esters, e.g. 1–12 carbon atom alkyl esters of acrylic or methacrylic acids, vinyl esters of fatty acids such as vinyl acetate, vinyl chloride, vinylidene chloride, methyl isopropenyl ketone, methyl vinyl ether, and acrylonitrile.

The term "water-soluble" is used herein to mean that the polymer sulfonates form true or colloidal solutions in pure water, which solutions are practically free of gel particles and infinitely dilutable with water.

By the term "linear" it is meant that the polymeric chain is free or nearly free of crosslinkages. A water-soluble polymer sulfonate is regarded as linear for practical purposes of this invention if its water solution is free of gels, infinitely dilutable with water, and filterable through ordinary filter paper (Whatman's Number 1) without loss of viscosity.

The term "high molecular weight" is used herein to mean that the polymer sulfonates have average molecular weights such that their "Brookfield viscosity" values are at least 300 centipoises. The term "Brookfield viscosity" as used herein and represented by the symbol $V_b$ is the viscosity value in centipoises at 25° C. of a neutral solution in water at 0.5 percent by weight concentration of the sodium salt of the polymer sulfonate as determined with the Brookfield viscometer using the No. 1 or No. 2 spindle rotated at 6 revolutions per minute (Leaman, Rubber Age, vol. 69, pp. 702–703). For this purpose, a sample of the pure sodium polymer sulfonate or of the pure acid form of the polymer sulfonate is dissolved in water, the acidic solution is neutralized to a pH value of approximately 7 by addition thereto of a one-normal aqueous solution of pure sodium hydroxide, and the solution is adjusted to a concentration of 0.5 percent by weight of the sodium form of the sulfonate.

The average molecular weight of a sulfonate whose Brookfield viscosity value is 300 centipoises is believed to be approximately 1.2 million; one whose Brookfield viscosity value is 800 centipoises is believed to have an average molecular weight of approximately 3.2 million.

The water-soluble, linear, high molecular weight polymer sulfonates for use in this invention are obtained either by polymerization of the corresponding monoethylenically unsaturated monomers including a monoalkenylaromatic sulfonate or by sulfonation of a starting polymer of monoethylenically unsaturated monomers including a polymerically combined monoalkenylaromatic hydrocarbon or nuclear chlorinated monoalkenylaromatic hydrocarbon.

When the polymer sulfonates are obtained by sulfonation of a monoalkenylaromatic polymer resin, the resin starting material is a toluene-soluble, thermoplastic, linear, high molecular weight addition polymer of a monoalkenylaromatic hydrocarbon or nuclear chlorinated monoalkenylaromatic hydrocarbon having the general formula:

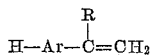

wherein H—Ar is a monovalent aromatic hydrocarbon or nuclear chlorinated hydrocarbon radical having its valence bond on a carbon atom of a sulfonatable aromatic nucleus, R is hydrogen or a methyl radical, and the other symbols have their usual meanings. By "sulfonatable," it is meant that the nucleus of the aromatic radical has at least one hydrogen atom replaceable by the sulfonic acid group by reaction with sulfonation agents such as sulfuric acid and sulfur trioxide.

Examples of such monoalkenylaromatic polymers are the solid homopolymers of styrene, α-methylstyrene, ar-methylstyrenes (ar-vinyltoluenes), ar-dimethylstyrenes, α, ar-dimethylstyrenes, ar-ethylstyrenes, vinylnaphthalenes, and ar-chlorostyrenes; copolymers of two or more of such monoalkenylaromatic compounds, e.g. copolymers of styrene and ar-vinyltoluene and copolymers of styrene and α-methylstyrene; and copolymers of a major proportion of one or more of such monoalkenylaromatic compounds and a minor proportion of other monovinylidene compounds such as monoethylenically unsaturated hydrocarbons, e.g. isobutylene, monoethylenically unsaturated esters, e.g. 1–12 carbon atom alkyl esters of acrylic or methacrylic acid, and acrylonitrile.

When the polymer sulfonates for use in this invention are made by sulfonation of monoalkenylaromatic hydrocarbon or nuclear chlorinated hydrocarbons, the starting polymers are further characterized as being linear, i.e., free of crosslinkages, and having high molecular weight, i.e. corresponding to toluence-soluble, solid, thermoplastic polymers of the kind just described whose solution viscosity values are at least 300 centipoises. The term "solution viscosity," as used in the present specification and claims and represented by the symbol $Vs$ means the viscosity value in centipoises at 25° C. of a 10 percent by weight solution of the polymer in toluene as determined with a modified Ostwald viscometer (1949 A.S.T.M. Standards, Part 6, pp. 478–479). Ordinary molding grades of polystyrene have solution viscosity values in the order of 20–25 centipoises and are not suitable for the present purposes.

Moreover, it is necessary that the means and method of sulfonation of the starting monoalkenylaromatic polymers be such that the resulting polymer sulfonates are water-soluble, linear, high molecular weight products whose Brookfield viscosity values are at least 300 centipoises, and not greater than a value numerically related to the value of the solution viscosity of the starting monoalkenylaromatic polymer in accordance with the formula:

$$\log_{10} Vb = 2.7 + 0.65 (\log_{10} Vs - 2)$$

wherein $Vs$ is the solution viscosity value of the starting monoalkenylaromatic polymer and $Vb$ is the Brookfield viscosity value of the sulfonated polymer, both as hereinbefore described.

Methods are already known per se for making polymer sulfonates conforming to the above-described characteristics. However, it will be understood by those skilled in the art that methods of making polymer sulfonates do not invariably produce products having the characteristics set forth above. It is the polymer sulfonate that is controlling in the present invention and not the procedure by which it is prepared.

In accordance with this invention, the viscosity of aqueous salt solutions is advantageously increased by incorporating therein a water-soluble, linear, high molecular weight polymer sulfonate of the kind described above. In these salt solutions, the cation or cations can be of any kind, inorganic or organic, whose salt of the polymer sulfonate is soluble in the resulting composition. Examples of such common cations are lithium, sodium, potassium, caesium, copper, magnesium, calcium, zinc, strontium, cadmium, barium, ferrous iron, cobaltous cobalt, nickel, ammonium, and organic ammonium, including cations of primary, secondary and tertiary amines, nitrogenous heterocyclics, and quaternary ammonium compounds, inter alia. The thickening effect of the resin sulfonates in making the viscous salt solutions of this invention is greater as to monovalent cation salts than as to di- and poly-valent cation salts. Particularly good results are obtained with aqueous salt solutions of the alkali metals, especially lithium, sodium, and potassium salts, which have little or no polyvalent metal salts therein. The anion or anions in such salt solutions can be of any kind, inorganic or organic. Examples of common anions are fluoride, chloride, bromide, iodide, nitrate, nitrite, sulfate, bisulfate, sulfite, bisulfite, sulfide, thiocyanate, arsenate, arsenite, borate, bromate, carbonate, bicarbonate, chlorate, perchlorate, hypochlorite, chromate, dichromate, cyanide, cyanate, fluosilicate, silicate, iodate, isocyanate, permanganate, phosphate, phosphite, thiosulfate, persulfate, ferrocyanide, ferricyanide, acetate, benzoate, citrate, formate, oxalate, oleate, stearate, tartrate, succinate, isothionate, and benzenesulfonate, inter alia. Aqueous solutions containing mixtures of compatible salts can, of course, be used. The salt solutions can contain the dissolved salts in any obtainable concentration. In addition to the dissolved salts, the aqueous compositions can also contain undissolved, e.g. suspended, material such as colloidally suspended pigments and clays, as well as any of a large variety of compatible non-salt solutes such as acids, bases, and non-electrolytes.

Accordingly, the viscous compositions of this invention comprise aqueous solutions of the water-soluble linear, high molecular weight monoalkenylaromatic sulfonate polymers of the kind specified in aqueous salt solutions. It will be understood that the concentration of the polymer sulfonate in such compositions will depend at least upon the kind and concentration of the dissolved salts, the kind of polymer sulfonate, and the viscosity desired in the resulting composition. In most instances, the amount of polymer sulfonate used in these compositions corresponds to not more than 5, usually not more than 2, percent by weight of the whole composition. In some instances, as little as 0.01 percent by weight of the polymer sulfonate, based on the whole composition, causes an appreciable and industrially valuable increase in the viscosity of the composition.

It might be mentioned here that the viscosity-increasing power of a polymer sulfonate toward pure water is of itself not a guide as to the viscosity-increasing power of that polymer sulfonate toward aqueous salt solutions. In instances where a water-soluble or water-swellable polymer sulfonate having great viscosity-increasing effect on pure water is substantially crosslinked, the effect thereof on the viscosity of a salt solution may be negligible.

The compositions of this invention are prepared by mixing the constituents together in usual ways. Solely for illustration and not for limitation, it might be mentioned that such compositions are prepared by mixing the polymer sulfonate into an aqueous salt solution, by mixing a salt into the polymer sulfonate aqueous solution, by mixing both polymer sulfonate and salt into water or an aqueous solution, or by mixing together an aqueous solution of the polymer sulfonate and an aqueous salt solution. In some instances, equilibrium in the resulting composition seems to be reached more quickly by adding the polymer sulfonate to the salt solution, although the final properties are characteristic of the composition and not of the mode of preparation.

The following examples illustrate the invention but are not to be construed as limiting its scope.

EXAMPLE 1

In Table 1 are shown data gathered in a number of tests on aqueous salt solutions containing 0.15 percent by weight of sodium chloride and also containing diverse polymer sulfonates prepared by sulfonation of diverse ar-vinyltoluene polymers. Tests 1–18, inclusive, relate to compositions containing polymer sulfonates of the kind specified and are in accordance with this invention. Tests 19 and 20 are for purpose of contrast and relate to compositions which are outside of the scope of the present invention in that the polymer sulfonates contained therein do not meet the required specifications. The compositions were prepared by intimately mixing the required amount of the neutral sodium salt of the polymer sulfonates into separate portions of an aqueous solution of the sodium chloride. The table shows the kind of base polymers (all of which were toluene-soluble, thermoplastic, solid, linear, high molecular weight polymers), and the solution viscosity values thereof as hereinbefore defined. The table further shows the "Brookfield viscosity" values of water solutions containing 0.5 percent by weight of the polymer sulfonates, all of which were water-soluble except the one employed in Test 19 for purpose of contrast, and the values of 0.1 percent by weight solutions in water of some of the sulfonates. The table also shows the viscosities in centipoises at 25° C. of aqueous solutions containing 0.15 percent by weight of sodium chloride (C.P. grade) and 0.10 percent (and in some tests also 0.20 percent) by weight of the respective polymer sulfonates in pure water. The viscosity of the sodium chloride solution alone, not containing any polymer sulfonate, was approximately 1.0 centipoise.

*Table 1*

| Test No. | Polymer | | Sulfonate [5] | | Viscosity of 0.15% NaCl Solution | |
|---|---|---|---|---|---|---|
| | Kind [1] | Solution Viscosity [2] | Viscosity of Water Solution | | 0.10% Sulfonate | 0.20% Sulfonate |
| | | | 0.5% [3] | 0.1% [4] | | |
| 1 | PVT | 921 | 950 | | 17 | |
| 2 | PVT | 921 | 1,310 | 610 | 27 | 116 |
| 3 | PVT | 1,564 | 720 | | 13 | |
| 4 | PVT | 1,564 | 1,200 | | 27 | |
| 5 | PVT | 1,572 | 1,210 | | 22 | |
| 6 | PVT | 4,150 | 560 | | 9 | |
| 7 | PVT | 4,150 | 740 | | 13 | |
| 8 | PVT | 4,150 | 860 | | 14 | |
| 9 | PVT | 4,150 | 870 | | 16 | 47 |
| 10 | PVT | 4,150 | 875 | | 15 | |
| 11 | PVT | 4,150 | 2,400 | 545 | 25 | 168 |
| 12 | PVT | 4,150 | 2,700 | | 26 | |
| 13 | PVT | 6,991 | 1,390 | 412 | 19 | 67 |
| 14 | PVT | 9,500 | 1,020 | | 14 | |
| 15 | PVT | 22,600 | 1,130 | | 13 | |
| 16 | PVT | 22,600 | 1,690 | | 17 | |
| 17 | PVT | 22,600 | 2,690 | | 37 | 197 |
| 18 | PVT, 5 VCN | 779 | 690 | | 14 | 49 |
| 19 | PVT | 1,091 | 100,000 | 4,500 | 2 | ([6]) |
| 20 | PVT | 839 | 24,000 | 3,930 | 3 | ([7]) |

[1] "PVT"=polyvinyltoluene, i.e. polymerized ar-vinyltoluene containing approximately 60 percent m-vinyltoluene and approximately 40 percent p-vinyltoluene by weight. "VCN"=acrylonitrile; the base polymer in test 18 contained approximately 5 percent by weight of acrylonitrile, the remainder being the mixture of m- and p-vinyltoluene of isomers just described.
[2] Viscosity in centipoises at 25° C. of a solution in toluene of 10 percent by weight of the base polymer, determined as hereinbefore defined.
[3] "Brookfield viscosity" as hereinbefore defined.
[4] Viscosity in centipoises at 25° C. of a neutral solution in water of the sodium salt form of the resin sulfonate, determined as described hereinbefore for the "Brookfield viscosity" but on a solution containing 0.1 percent by weight of the resin sulfonate.
[5] The resin sulfonates were employed in their neutral sodium salt form. The viscosity values are in centipoises at 25° C. of the resulting solutions determined with the Brookfield viscometer using the No. 1 spindle rotated at 6 revolutions per minute (cf. the "Brookfield viscosity" described hereinbefore).
[6] Test 19, for purpose of contrast, employed a sulfonated resin which was not clearly water-soluble but highly water-swellable and having great thickening power in water.
[7] Test 20, also for purpose of contrast, employed another sulfonated resin which had great thickening power in water.

It will be seen from the data in Table 1 that in Tests 1–18, inclusive, relating to aqueous salt compositions in accordance with this invention, the viscosity of the salt solution was considerably increased by the presence therein of the particular water-soluble, linear, high molecular weight polymer sulfonates specified by this invention. These results are in contrast to those obtained in Tests 19 and 20 with polymer sulfonates which had a great thickening effect on pure water but almost no thickening effect on the sodium chloride solution.

Thickened aqueous sodium chloride solutions containing high molecular weight, linear, water-soluble polymer sulfonates in accordance with this invention are advantageously employed as drilling fluids in boring earth wells and as driving media for secondary oil recovery.

EXAMPLE 2

A thickened salt solution for use in water-flooding of subterranean formations for secondary recovery of petroleum therefrom is prepared from an oil field water containing approximately 0.15 percent by weight sodium chloride by dissolving therein 0.1 percent by weight of the sodium salt of the sulfonate described in Test 13 of Example 1. A more viscous solution is obtained when 0.2 percent by weight of the sulfonate is used.

EXAMPLE 3

A standard drilling mud is prepared by dispersing a bentonitic-type clay in an oil-field brine water containing sodium chloride, and the viscosity is found to be 6 centipoises. The viscosity is advantageously increased by adding 4 pounds per 42-gallon barrel of the mud of the sodium salt of the sulfonate described in Test 17 of Example 1.

EXAMPLE 4

Another portion of the neutral sodium salt form of the polymer sulfonate used in Test 11 of Example 1 was dissolved at 0.10 percent by weight concentration in 0.15 percent by weight solutions of several salts in water and the viscosity values of the resulting thickened solutions at 25° C. were determined in the manner described hereinbefore on the Brookfield viscometer with the following results:

0.15 percent $KNO_3$ solution, viscosity 42 centipoises
0.15 percent $Na_2CO_3$ solution, viscosity 30 centipoises These results are in contrast to those obtained in like manner on corresponding salt solutions to which was added 0.10 percent by weight of the sulfonate used in Test 20 of Example 1, the viscosities of the resulting solutions being only slightly greater than those of the salt solutions without added sulfonate.

EXAMPLE 5

To 150 ml. of a 10 percent by weight solution of sodium chloride in water was added a sulfonated polymer in amounts shown in Table 2. The sulfonated resin was the sodium salt form of a high molecular weight linear sulfonate having a Brookfield viscosity of 650 centipoises (0.5 percent solution of the sodium salt in pure water). The sulfonate was obtained by sulfonation of a polymer of ar-vinyltoluene (mixture of approximately 60 percent meta-isomer and 40 percent para-isomer) having a solution viscosity of 6991 centipoises (10 percent solution of the polymer in toluene). Table 2 shows the viscosity value (Brookfield viscometer at 25° C.) for the resulting salt solutions.

*Table 2*

| Sulfonate concentration, grams in 150 ml., of 10 percent NaCl in water: | Viscosity, centipoises |
|---|---|
| 0.6 | 5.9 |
| 1.2 | 9.0 |
| 1.8 | 16.2 |

EXAMPLE 6

To 100-ml. portions of water solutions containing sodium acetate in proportions shown in Table 3 were added 0.5 gram portions of the sodium salt form of a sulfonated polymer like that used in Test 17 (Table 1) of Example 1. The viscosities of the resulting thickened salt solutions were measured at 25° C. with the Brookfield viscometer (No. 2 spindle, 6 r.p.m.) and are shown in Table 3.

*Table 3*

Na acetate, percent by weight: Viscosity, centipoises
- None (blank) _____ 1500
- 0.01 _____ 1240
- 0.03 _____ 960
- 0.05 _____ 530
- 0.15 _____ 380
- 0.5 _____ 170
- 1.0 _____ 110

EXAMPLE 7

In this example, several sulfonates, identified below as 7A, 7B, and 7C respectively, were used which were water-soluble, linear, high molecular weight polymers obtained by polymerizing monomeric sodium styrenesulfonate. The starting monomer was predominantly the para-isomer and was polymerized by heating in aqueous solution. In Table 4 below are shown, for each sulfonate, the approximate molecular weight as calculated from viscosity measurements and the viscosity values in centipoises of solutions thereof in water and in 0.15 percent by weight sodium chloride solutions at the concentrations shown in weight percent, the viscosity values being measured at 25° C. with the Brookfield viscometer.

*Table 4*

| Sulfonate | Molecular Weight | Viscosity at 25°C. | | |
|---|---|---|---|---|
| | | Water, 0.5% | Water, 0.1% | 0.15% NaCl 0.1% |
| 7A | $1.5 \times 10^6$ | 375 | 142 | 7 |
| 7B | $3.2 \times 10^6$ | $8 \times 10^2$ | $3 \times 10^2$ | 15 |
| 7C | $5 \times 10^6$ | $3 \times 10^3$ | $4.2 = 10^2$ | 19 |

In place of the particular polymer sulfonates used in these specific examples to make viscous aqueous salt solutions in accordance with this invention, other of the water-soluble, linear, high molecular weight, monoalkenylaromatic polymer sulfonates, having the characteristics hereinbefore specified, are used with analogous results. In place of the particular salts employed in the specifically exemplified compositions, there are used other of the salts hereinbefore described. When the salt solution contains polyvalent cations such as calcium ions, the viscosity-increasing effect of the specified polymer sulfonates is somewhat less than it is in salt solutions containing only monovalent cations, but the viscosity-increasing effect of the presently specified polymer sulfonates in such polyvalent cation solutions is appreciably greater than that of other alkenylaromatic sulfonates, outside of the present specification.

In one method of preparation of monoalkenylaromatic polymer sulfonates suitable for use in viscous salt solutions in accordance with this invention, a solid monoalkenylaromatic polymer or copolymer as hereinbefore defined is dissolved in a mixture consisting essentially of from 20 to 80 percent by weight of liquid sulfur dioxide, the remainder being at least one chlorinated aliphatic hydrocarbon of the group consisting of methylene chloride, ethylene chloride, carbon tetrachloride, methyl chloroform, and tetrachloroethylene. The resulting solution contains 5 or less percent by weight, preferably from 0.5 to 2 percent by weight, of the polymer to be sulfonated. The solution is stirred and maintained at temperatures between −20° and 40° C., and a solution containing 5 or less percent by weight of freshly-prepared sulfur trioxide in a separate portion of the aforementioned mixed solvent, or in one of the ingredients of the mixed solvent, is added with stirring. The addition is made quite rapidly, e.g. over a period of from 1 to 20 minutes, and the reaction mixture is maintained under sufficient pressure to maintain at least a major portion of the solvent mixture in liquid condition. Sufficient sulfur trioxide is employed to provide a proportion corresponding to the introduction of between 0.7 and 1.1 sulfonic acid radical per aromatic nucleus of the polymer being sulfonated. Upon completion of the sulfonation reaction, the sulfonate precipitates from the reaction medium and is separated and recovered by conventional procedures such as filtration, washing with fresh portions of the solvent mixture and/or with other liquid extractants, and drying.

The acid forms of the polymer sulfonates are converted to salt forms by reaction with bases such as alkali metal bases, alkaline earth metal bases, ammonia or amine bases. For example, the acid forms of the polymer sulfonates are reacted with ammonia, sodium hydroxide, sodium carbonate, sodium bicarbonate, potassium hydroxide, lithium hydroxide, or calcium hydroxide to form the corresponding salt forms.

This application is a continuation-in-part of a copending application of Harold H. Roth, Serial No. 758,580, filed September 2, 1958, now abandoned, for "Viscous Compositions of Aqueous Salt Solutions and Sulfonated Alkenylaromatic Polymers."

That which is claimed is:

1. Viscous compositions comprising an aqueous solution of two mutually compatible solutes including a water-soluble thickening agent and a water-soluble inorganic salt, which aqueous solution has appreciably greater viscosity than the corresponding water-soluble inorganic salt solution without the viscosity-increasing agent, wherein the viscosity-increasing agent is a linear, high molecular weight, water-soluble polymer sulfonate selected from the group consisting of (A) an addition polymer of a monoalkenylaromatic sulfonate having the formula

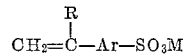

wherein Ar is a divalent aromatic radical selected from the group consisting of hydrocarbon radicals and nuclear chlorinated hydrocarbon radicals having its valence bonds on nuclear carbon atoms, R is a member of the group consisting of hydrogen and methyl, and M is a cation such that said addition polymer of a monoalkenylaromatic sulfonate is water-soluble, said addition polymer of a monoalkenylaromatic sulfonate in its neutral sodium salt form at 0.5 percent by weight concentration in pure water having a Brookfield viscosity of at least 300 centipoises at 25° C., and (B) a water-soluble, linear, high molecular weight sulfonate of a high molecular weight monoalkenylaromatic polymer, the monoalkenylaromatic polymer portion corresponding to a toluene-soluble, thermoplastic solid addition polymer of a monoalkenylaromatic compound having the formula

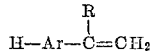

wherein H—Ar is a monovalent aromatic radical selected from the group consisting of sulfonatable aromatic hydrocarbon radicals and sulfonatable nuclear chlorinated aromatic hydrocrabon radicals and having its valence bond on a carbon atom of the aromatic nucleus and R is a member of the group consisting of hydrogen and methyl, which monoankenylaromatic polymer is further characterized by having a solution viscosity $Vs$ at 25° C. in nine times its weight of toluene of at least 300 centipoises, said sulfonate in its neutral sodium salt form at 0.5 percent by weight concentration in pure water having a Brookfield viscosity $Vb$ at 25° C. of at least 300 centipoises and not greater than that represented by the equation $$\log_{10} Vb = 2.7 + 0.65 (\log_{10} Vs - 2)$$

the polymer sulfonate being soluble in the aqueous salt solution and present in amount corresponding to from about 0.01 to about 5 percent by weight of the viscous composition.

2. Viscous compositions according to claim 1 wherein the inorganic salt in the aqueous salt solution consists essentially of inorganic salts of monovalent cations.

3. Viscous compositions according to claim 1 wherein the viscosity-increasing agent is a water-soluble, linear, high molecular weight sulfonate of a high molecular weight monoalkenylaromatic polymer, the monoalkenylaromatic polymer portion corresponding to a toluene-soluble, thermoplastic solid addition polymer of a monoalkenylaromatic compound having the formula

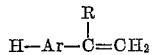

wherein H—Ar is a monovalent aromatic radical selected from the group consisting of sulfonatable aromatic hydrocarbon radicals and sulfonatable nuclear chlorinated aromatic hydrocarbon radicals and having its valence bond on a carbon atom of the aromatic nucleus and R is a member of the group consisting of hydrogen and methyl, which monoalkenylaromatic polymer is further characterized by having a solution viscosity $Vs$ at 25° C. in nine times its weight of toluene of at least 300 centipoises, said sulfonate in its neutral sodium salt form at 0.5 percent by weight concentration in pure water having a Brookfield viscosity $Vb$ at 25° C. of at least 300 centipoises and not greater than that represented by the equation $$\log_{10} Vb = 2.7 + 0.65 (\log_{10} Vs - 2)$$

4. Viscous compositions according to claim 3 wherein the sulfonated polymer is a sulfonated polymer of ar-vinyltoluene.

5. Viscous compositions according to claim 1 wherein the viscosity-increasing agent is a water-soluble, linear, high molecular weight homopolymer of a monoalkenylaromatic sulfonate.

6. Viscous compositions according to claim 1 wherein the viscosity-increasing agent is a water-soluble, linear, high molecular weight homopolymer of a sodium styrenesulfonate.

References Cited in the file of this patent
UNITED STATES PATENTS

| | | |
|---|---|---|
| 2,533,210 | Baer | Dec. 12, 1950 |
| 2,604,456 | Signer | July 22, 1952 |
| 2,612,485 | Baer et al. | Sept. 30, 1952 |
| 2,683,137 | Roth | July 6, 1954 |
| 2,804,446 | Roth | Aug. 27, 1957 |
| 2,813,087 | Roth | Nov. 12, 1957 |
| 2,835,655 | Bauman et al. | May 20, 1958 |
| 2,877,213 | Eichhorn | Mar. 10, 1959 |
| 2,945,842 | Eichhorn et al. | July 19, 1960 |